United States Patent Office 2,818,389
Patented Dec. 31, 1957

2,818,389

ORGANIC SILICON COMPOUNDS, PROCESS OF MAKING THE SAME AND METHOD OF TRANSFERRING HEAT THEREWITH

Ettore Da Fano, Pasadena, Calif., and Hans I. Sternheim, Somerville, N. J., assignors to John B. Pierce Foundation, New Haven, Conn., a corporation of New York No Drawing. Application October 15, 1954
Serial No. 462,616

5 Claims. (Cl. 252—78)

This invention relates to novel compositions of mixed phenyl-aroxy silanes, particularly useful as fluid heat transfer media, to a method of making the same and to a method of transferring heat therewith.

The production of an efficient liquid phase heat transfer medium operable at high temperatures for long periods of time and resistant to decomposition and chemical reaction has long been sought. Many individual compounds and mixtures thereof have been suggested.

The tetra-aryl orthosilicates, for example, have been proposed as heat transfer media, as disclosed by the patent to Johnston, No. 2,335,012, alone and in combination with tetra-ethyl orthosilicates. Such compositions lack satisfactory heat stability over long periods of time and are not sufficiently resistant to hydrolysis. In the case of such compounds, the leakage of water or steam into the heat transfer system may result in clogging of the system caused by formation of gums or gels by reaction of water with the heat transfer medium.

In Morgan et al. Patent No. 2,674,579 there are disclosed certain phenyl-aroxy silanes prepared by the reaction of phenyltrichlorosilane with a mixture of phenol and cresol. These compounds are good heat transfer liquids but their stability when heated is often less than desired.

Accordingly, it is an object of this invention to provide a heat transfer medium particularly useful at higher temperatures.

Another object of the invention is to provide a heat transfer medium having exceptionally good heat stability.

Still another object of this invention is the obtention of a heat transfer medium which is highly resistant to hydrolysis.

It has now been found that certain disproportionation mixtures of phenyl-aroxy silanes in which part of the aroxy groups are diphenoxy groups meet the above objectives.

The compositions of this invention are disproportionation mixtures of phenyl-aroxy silanes having the average formula:

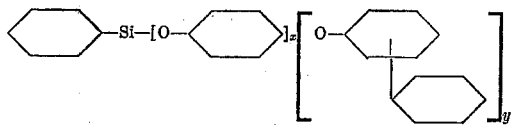

wherein $x$ represents a numerical value from 2 to 2.5 and $y$ represents a numerical value from 0.5 to 1, the total of $x$ and $y$ being 3.

The compositions are further characterized by being liquids at room temperature and having high boiling points. By virtue of their surprisingly superior heat stability and high resistance to hydrolysis, they are eminently suitable for use as heat transfer media.

The method of preparing the compositions comprises reacting phenyltrichlorosilane in substantially stoichiometric proportions with a mixture of phenol and a phenylphenol. This reaction may be illustrated by the following equation in which a mixture of phenol and o-phenylphenol were chosen to represent the mixture of phenols:

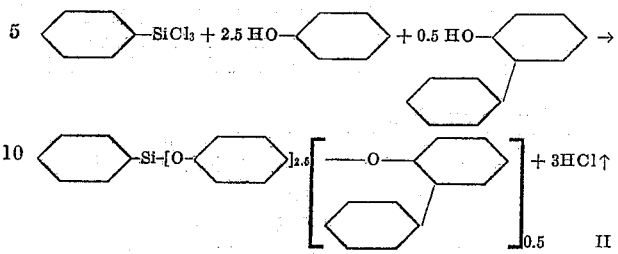

The formula above, representing the product of the reaction, is given only as an average formula, the product actually being a disproportionation equilibrium mixture of the four compounds,

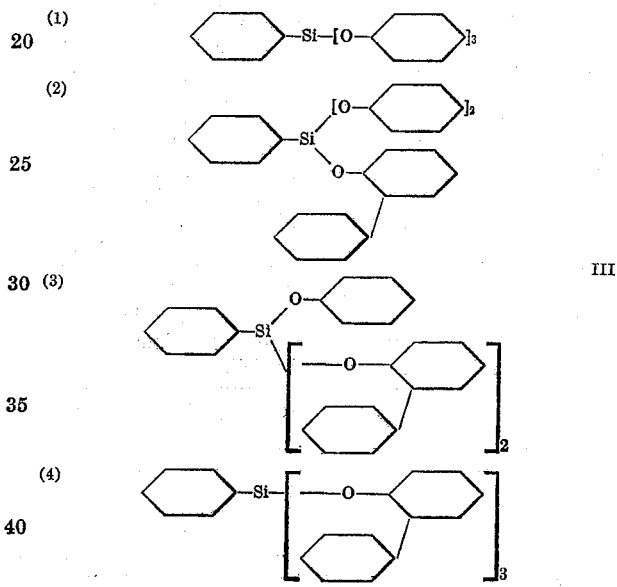

The reaction will take place merely upon mixing of the compounds at room temperature, but the temperature is selected to facilitate control of the reaction. Since the reaction proceeds in accordance with the general rules of chemistry and is accelerated by heat, it is preferred to heat the reactants to an elevated temperature up to the reflux temperature of the reaction mixture at some stage during the reaction, preferably near the end, to hasten and assure completion.

In performing the reaction, precautions should be taken to prevent too rapid evolution of the hydrogen chloride gas. This may be done by adding the phenyltrichlorosilane gradually to the mixture of phenols while the mixture is at an elevated temperature. However, all of the reactants may be mixed initially provided the temperature is low enough, i. e., room temperature, and thereafter the temperature may be raised gradually.

The phenylphenol may be either o-, m-, or p-phenylphenol. O-phenylphenol is preferred for reasons of availability and convenience.

In selecting the phenolic compounds to make up the mixture of phenols, it is essential that the proportions of compounds in the mixture be such that the resultant product will have the average formula I given above. This means that for each mol of phenyltrichlorosilane there must be included from 2 to 2.5 mols of phenol and correspondingly from 1 to 0.5 mol of phenylphenol to provide a total of 3 mols of phenolic compounds. When it is attempted to use less phenol than the 2 mol lower limit, the resultant product is an extremely viscous, resin-like material too immobile to be satisfactorily used as a heat transfer medium. Conversely, if the quantity of phenol exceeds the upper limit of 2.5 mols, the resultant product will be a crystalline solid with too high a melting point for convenient use as a heat transfer medium.

The discussion hereinabove relating to the proportions of phenolic compounds in the reaction mixture is qualified to a slight degree by the fact that it is often preferred to employ an excess of phenolic reactants. This excess of reactants is employed only to accelerate the reaction which follows the law of mass action, and is usually removed following the reaction.

The following examples are given for purposes of illustration only and not for purposes of limitation. Except as otherwise noted, parts are by weight.

EXAMPLE 1

Into a reaction vessel equipped with an agitator and reflux condenser there is placed a mixture of 134 parts (0.79 mol) of o-phenylphenol and 243 parts (2.59 mols) of phenol. The mixture is heated to 64° C. and 211.5 parts (1.0 mol) of phenyltrichlorosilane is added gradually over a period of one hour while maintaining the temperature of the reaction mixture at approximately 60° C. The reaction mixture is then heated gradually to reflux temperature and maintained there for a period of several hours to complete the reaction. The excess of unreacted phenols is then distilled off. The yield of finished product is greater than 96% of the theoretical yield. The finished product is a liquid of specific gravity 1.1502, having a viscosity of 5370 centistokes at 32° F., 155.5 centistrokes at 77° F. and 9.22 centistokes at 185° F. The pour point of the liquid is 15° F., the boiling point 830° F., the flash point 485° F. and the fire point 560° F. It is determined that the liquid product is a mixture of four individual compounds which may be separated by fractional distillation. The mixture comprises the following compounds:

(1) 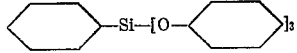

(2) 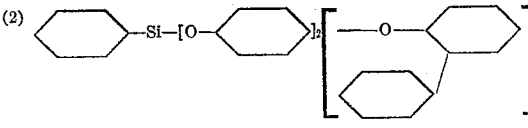

(3) 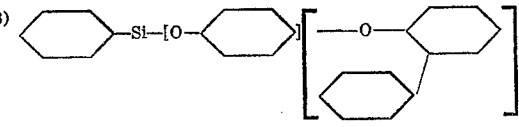

IV (4) 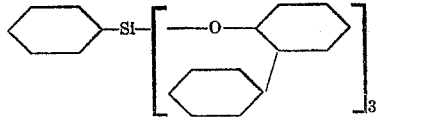

Compound (1) is a crystalline solid at room temperature and thus is not conveniently useful alone as a heat transfer medium. Compound (4) has a relatively high viscosity at room temperature and is thus handicapped for use as a heat transfer medium. The combination of the four compounds, however, does not crystallize at any temperature and is eminently suitable for use as a heat transfer medium.

EXAMPLE 2

The liquid product of Example 1 is subjected to hydrolysis tests with hot water and aqueous solutions of ammonia. No change is observed on heating with an excess of water at 100° C. for ten minutes or on heating at 115° C. (water boiling) for one hour. After cooling some solid matter is observed at the bottom of the liquid, but on heating, this solid matter quickly dissolves in the liquid. A repetition of the experiment using dilute ammonia instead of water shows the same excellent resistance to hydrolysis. Contrasted with these results, a disproportionation mixture of phenyl-cresyl orthosilicates forms a complete gel almost immediately upon heating in excess water at 115° C. (water boiling). In contact with dilute ammonia, complete gelling of the phenyl-cresyl orthosilicates also occurs almost immediately.

EXAMPLE 3

The procedure of Example 1 was repeated using various other ratios of phenol to o-phenylphenol. 1.00 mols of phenyltrichlorosilane was added slowly with agitation to 1.60 mols of phenol and 1.60 mols of o-phenylphenol. After complete addition, heat was applied while HCl was evolved. The mixture was refluxed for several hours until no more HCl could be detected. The excess phenols were distilled off leaving an orange colored viscous liquid; viscosity at 77° F.=2068 cs., in 93% yield. The product is a disproportionated mixture of the following empirical formula:

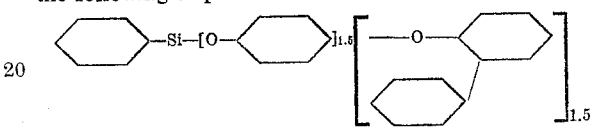

Thus, when more than about 1 mol of o-phenylphenol (and less than about 2 mols of phenol) was used, the product was too viscous at room temperature for use as a heat transfer medium. (Engineers consider 1000 centistokes to be the approximate limit.)

When less than about 0.5 mol of o-phenylphenol was used, the product was a solid with too high a melting point to be a satisfactory heat transfer medium.

EXAMPLE 4

The disproportionation product of the formula

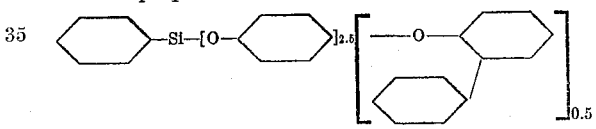

was prepared according to the procedure of Example 1 by heating together 1 mol of phenyltrichlorosilane with 2.87 mols of phenol and 0.52 mol of o-phenylphenol until hydrogen chloride ceased to be liberated. The product consisted of a disproportionation mixture of the four following silanes:

(1) 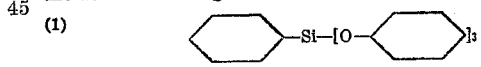

(2) 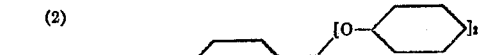

V (3) 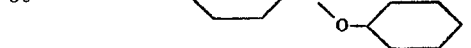

(4) 

Yield: 94.6%
Color: Pale yellow
Kinematic viscosity: 100.0 cs./77° F.

EXAMPLE 5

The extraordinary heat stability of a composition prepared as described in Example 4 is shown by the very slow increase in viscosity of a sample heated for more than a year at 700° F. in apparatus which permitted the escape of decomposition products when their vapor pressure exceeded atmospheric by ten pounds per square inch.

The initial viscosity of the liquid at 77° F. was 90 centistokes. A sample removed after 84 days and stripped of low boiling decomposition products had a viscosity of 97 cs. at 77° F.;

After 175 days the viscosity was 104.1 cs. at 77° F.
After 229 days the viscosity was 108.1 cs. at 77° F.
After 308 days the viscosity was 114.4 cs. at 77° F.
After 473 days the viscosity was 127.5 cs. at 77° F.

The viscosity of the liquid seems to increase at a fairly constant rate of about .085 centistoke per day when heated at 700° F.

EXAMPLE 6

The disproportionation product of formula:

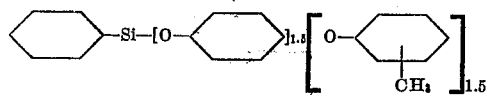

was prepared according to the procedure of Example 1 by heating together 1 mol phenyltrichlorosilane with 1½ mols each of phenol and a commercial mixture of isomeric cresols until all the hydrogen chloride was liberated. The product consisted of a disproportionation mixture of the following four silanes:

(1)
(2)

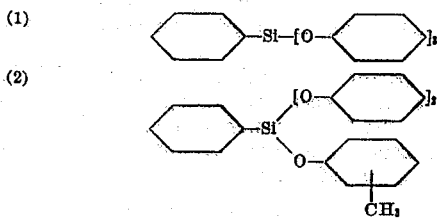

(3)
(4)

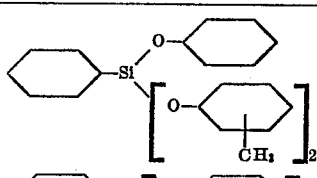

Yield: 92.0%
Color: Yellow
Viscosity: 53.2 cs./77° F.

This compound is illustrative of the prior art.

Triplicate samples of the products of Examples 4 and 6 were simultaneously subjected to a heat stability test at 800° F. to determine their relative rate of decomposition. In this test the samples were placed in cylindrical glass tubes sealed at one end and the other sealed to 2 mm. bore capillary tubes which permitted low boiling decomposition products to escape but restricted the entrance of air. The tubes were heated by partial immersion in a molten mixture salt, constant temperature bath maintained at 800° F.

EXAMPLE 7

The disproportionation product of the formula:

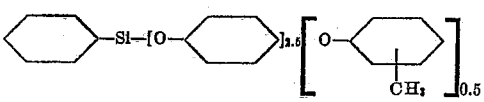

was prepared as in Example 1 by heating together 1 mol phenyltrichlorosilane with 2.87 mols phenol and 0.52 mol cresol until all the hydrogen chloride was liberated. The product consisted of the four different silanes of VI.

Yield: 97.4%
Color: Straw
Viscosity: 45 cs./77° F.

In the following table of heat test results, the product of Example 6, produced by reacting 1 mol of phenyltrichlorosilane with equimolecular amounts of phenol and cresol, is shown to have reached a viscosity of 1000 centistokes between 94 and 142 hours. The product of Example 7 reached 1000 centistokes between 238 and 286 hours. Engineers consider 1000 centistokes to be the maximum viscosity of a heat transfer liquid that can be circulated by a centrifugal pump in starting up a cold heat transfer system.

The product of Example 4 shows a vast improvement over that of Examples 6 and 7 in heat stability. Example 5 shows that this composition did not reach a viscosity of 1000 centistokes even after more than a year at 700° F.

*Kinematic viscosities in centistokes at 77° F. after having been heated at 800° F.*

| | 48 hrs. | 94 hrs. | 142 hrs. | 190 hrs. | 238 hrs. | 286 hrs. | 484 hrs. |
|---|---|---|---|---|---|---|---|
| Example 6: C₆H₅Si(OC₆H₅)₁.₅(OC₆H₄CH₃)₁.₅ | 191.8 | 831.0 | 3,085 | | | | |
| | 189.0 | 642.7 | 4,384 | | | | |
| | 144.0 | 466.0 | 4,602 | | | | |
| Kinematic viscosity before heat stability test: 51.1 cs./77° F., Ave | 174.9 | 646.6 | 4,023 | | | | |
| Example 7: C₆H₅Si(OC₆H₅)₂.₅(OC₆H₄CH₃)₀.₅ | 81.2 | 129.0 | 220.5 | 336.0 | 690.6 | 2,280 | |
| | 86.8 | 117.5 | 219.0 | 353.6 | 750.9 | 2,083 | |
| | 84.0 | 130.7 | 274.3 | 489.5 | 999.0 | 2,669 | |
| Kinematic viscosity before heat stability test: 43.1 cs./77° F., Ave | 84.0 | 125.7 | 237.9 | 393.0 | 813.5 | 2,344 | |
| Example 4: C₆H₅Si(OC₆H₅)₂.₅(OC₆H₄C₆H₅)₀.₅ | 108.1 | 117.0 | 127.0 | 137.6 | 150.8 | 166.0 | 289 |
| | 117.1 | 126.0 | 138.7 | 147.5 | 168.1 | 180.1 | 345 |
| | 107.6 | 118.7 | 131.5 | 145.4 | 163.7 | 188.2 | 350 |
| Kinematic viscosity before heat stability test: 100.0 cs./77° F., Ave | 110.9 | 120.6 | 132.4 | 143.5 | 160.9 | 178.1 | 328.1 |

EXAMPLE 8

A product of empirical formula:

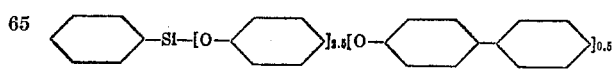

was prepared by the reaction of 1 mol phenyltrichlorosilane with 2.87 mols phenol and 0.52 mol of p-phenylphenol. Upon heating, 3 mols of hydrogen chloride was liberated.

The product was prepared in 100% yield, was amber in color and had a viscosity of 121.3 cs. at 77° F. and had excellent heat stability. The product consists of a disproportionated mixture of four compounds:

(1) 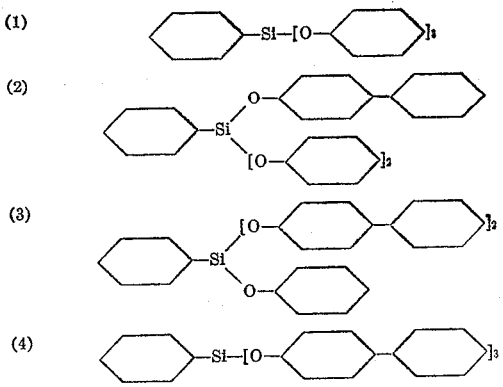

(2)

(3)

(4)

EXAMPLE 9

A product of empirical formula:

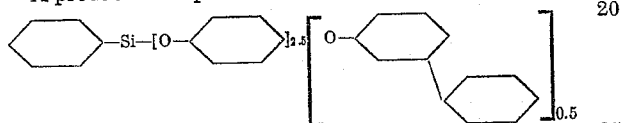

was prepared by the reaction of 1 mol phenyltrichlorosilane with 2.87 mols phenol and 0.52 mol of m-phenylphenol. Upon heating, 3 mols of hydrogen chloride was liberated.

The product was formed in 86.4% yield, was a straw color, and had a viscosity of 106.0 cs. at 77° F. It had excellent heat stability.

The term "disproportionation mixture" as employed herein refers to the nature of the mixture and not to the method by which it is made.

It is intended to cover all changes and modifications in the examples of this invention, herein chosen for purposes of disclosure, which do not constitute departure from the spirit and scope of the appended claims.

This application is a continuation-in-part of our copending application Serial No. 316,308 filed October 22, 1952, now abandoned.

We claim:

1. A composition of matter consisting essentially of a mixture in disproportionation equilibrium of the compounds, (1)

(2)

(3) 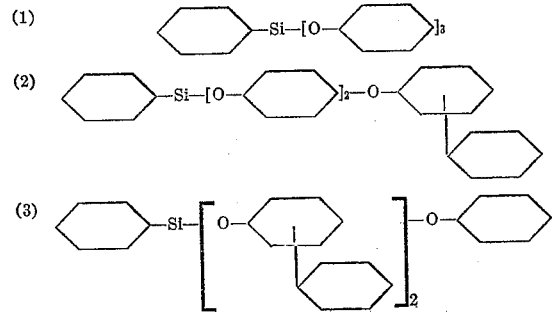

(4) 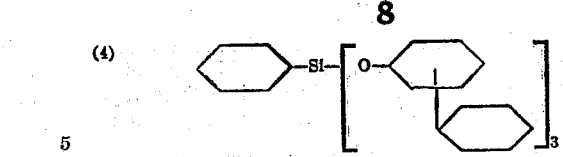

said mixture having the average formula,

VII 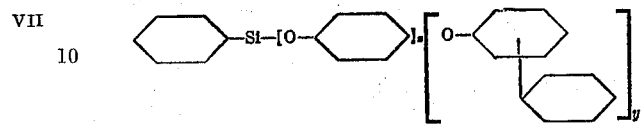

where $x$ is a numerical value from 2 to 2.5, $y$ is a numerical value from 0.5 to 1 and the sum of $x$ and $y$ is 3.

2. A composition according to claim 1 in which the phenylphenoxy radical is

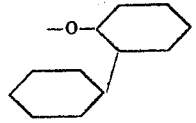

3. The process which comprises reacting approximately 1 mol of phenyltrichlorosilane with a mixture of approximately 3 mols of phenolic compounds said mixture comprising from 2 to 2.5 moles of phenol and from 0.5 to 1 mol of a phenylphenol.

4. A process according to claim 3 in which the mixture of phenolic compounds comprises phenol and orthophenylphenol.

5. In a process for transmitting heat to materials in indirect contact with a heat transmitting medium, a step of employing as the heat transfer medium a mixture of compounds in disproportionation equilibrium, said mixture having the average formula,

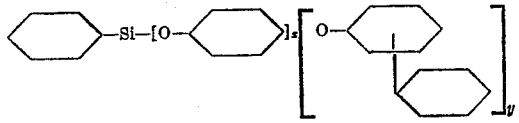

wherein $x$ represents a numerical value from 2 to 2.5, $y$ represents a numerical value from 0.5 to 1, and the sum of $x$ and $y$ is 3.

References Cited in the file of this patent

UNITED STATES PATENTS

| | | |
|---|---|---|
| 2,584,334 | DeFano | Feb. 5, 1952 |
| 2,611,779 | Speyer | Sept. 23, 1952 |
| 2,641,581 | DeFano | Jan. 8, 1953 |
| 2,674,579 | Morgan et al. | Apr. 6, 1954 |

FOREIGN PATENTS

| | | |
|---|---|---|
| 1,082,863 | France | June 23, 1954 |

U. S. DEPARTMENT OF COMMERCE

PATENT OFFICE

CERTIFICATE OF CORRECTION

Patent No. 2,818,389                        December 31, 1957

Ettore Da Fano, et al.

It is hereby certified that error appears in the printed specification of the above numbered patent requiring correction and that the said Letters Patent should read as corrected below.

Column 3, line 31, first and second occurrence, for "centistrdkes" read -- centistokes --; line 32, for "centistrokes" read -- centistokes --; column 6, line 9, for "mixture" read -- mixed --.

Signed and sealed this 4th day of March 1958.

(SEAL)

Attest:
KARL H. AXLINE

Attesting Officer

ROBERT C. WATSON
Commissioner of Patents